United States Patent [19]

Hutter et al.

[11] 4,012,282

[45] Mar. 15, 1977

[54] MULTIPLE LEAD SEAL ASSEMBLY FOR A LIQUID-METAL-COOLED FAST-BREEDER NUCLEAR REACTOR

[75] Inventors: Ernest Hutter, Wilmette; John A. Pardini, Brookfield, both of Ill.

[73] Assignee: The United States of America as represented by the United States Energy Research and Development Administration, Washington, D.C.

[22] Filed: May 17, 1976

[21] Appl. No.: 686,989

[52] U.S. Cl. .............................. 176/87; 176/19 R; 174/151

[51] Int. Cl.² .................................. G21C 17/10

[58] Field of Search ............. 176/19 R, 19 EC, 87; 174/23 R, 151

[56] References Cited

UNITED STATES PATENTS

| | | | |
|---|---|---|---|
| 2,827,509 | 3/1958 | Wayman | 174/77 |
| 2,877,288 | 3/1959 | Bollmeier | 174/92 |
| 2,993,082 | 7/1961 | Gainer et al. | 174/151 X |
| 3,716,450 | 2/1973 | Lions | 176/19 R |
| 3,801,722 | 4/1974 | Korner | 174/151 X |
| 3,913,407 | 10/1975 | Hanff et al. | 176/19 R X |
| 3,922,477 | 11/1975 | Glowacz | 174/23 R X |

FOREIGN PATENTS OR APPLICATIONS

| | | | |
|---|---|---|---|
| 1,490,332 | 1/1969 | Germany | 174/151 |

*Primary Examiner*—Peter A. Nelson
*Attorney, Agent, or Firm*—Dean E. Carlson; Arthur A. Churm; Joseph N. Hosteny

[57] ABSTRACT

A reusable multiple lead seal assembly provides leak-free passage of stainless-steel-clad instrument leads through the cover on the primary tank of a liquid-metal-cooled fast-breeder nuclear reactor. The seal isolates radioactive argon cover gas and sodium vapor within the primary tank from the exterior atmosphere and permits reuse of the assembly and the stainless-steel-clad instrument leads. Leads are placed in flutes in a seal body, and a seal shell is then placed around the seal body. Circumferential channels in the body and inner surface of the shell are contiguous and together form a conduit which intersects each of the flutes, placing them in communication with a port through the wall of the seal shell. Liquid silicone rubber sealant is injected into the flutes through the port and conduit; the sealant fills the space in the flutes not occupied by the leads themselves and dries to a rubbery hardness. A nut, threaded onto a portion of the seal body not covered by the seal shell, jacks the body out of the shell and shears the sealant without damage to the body, shell, or leads. The leads may then be removed from the body. The sheared sealant is cleaned from the body, leads, and shell and the assembly may then be reused with the same or different leads.

3 Claims, 6 Drawing Figures

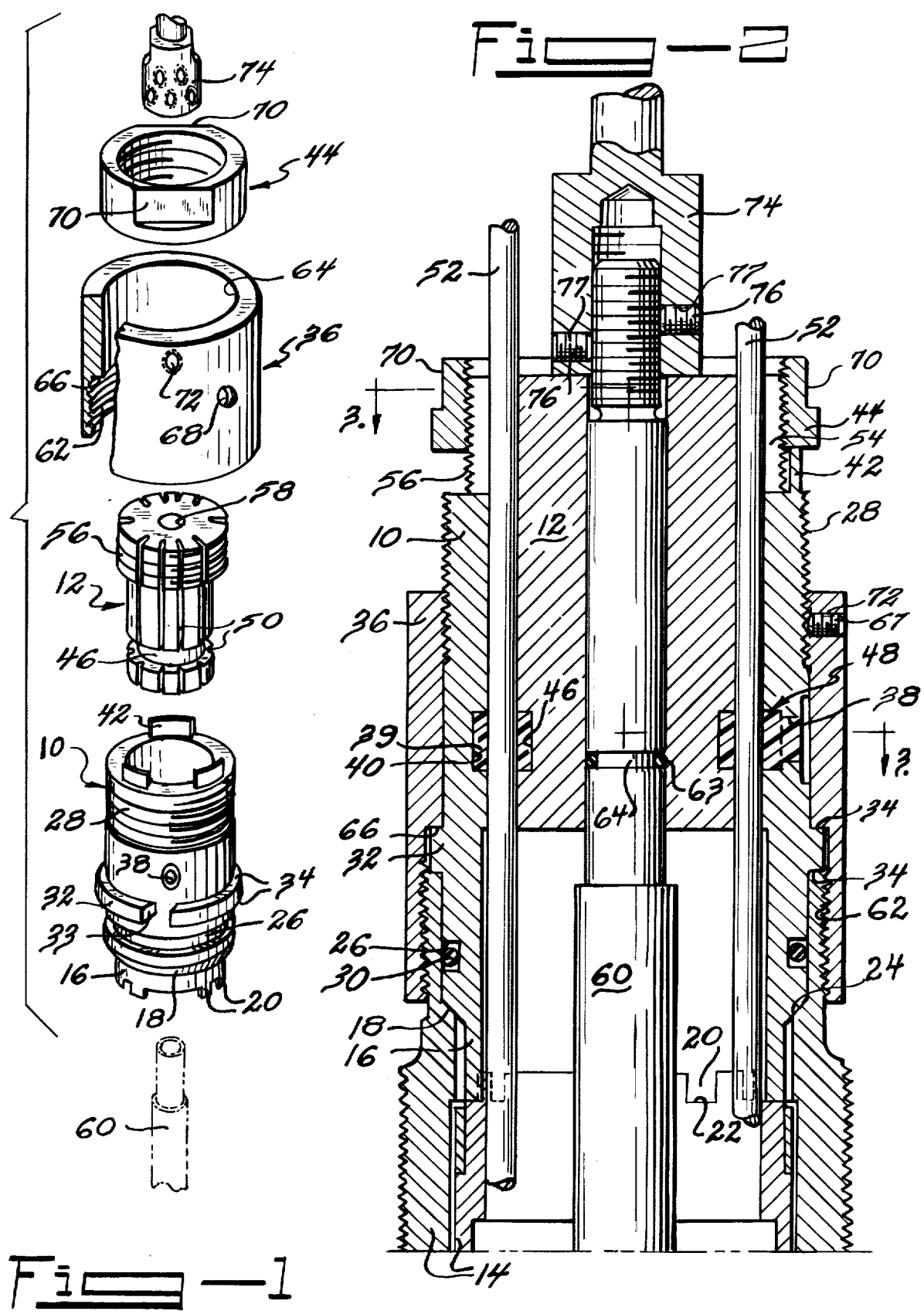

MULTIPLE LEAD SEAL ASSEMBLY FOR A LIQUID-METAL-COOLED FAST-BREEDER NUCLEAR REACTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

The invention is directed to an assembly for sealing the space around instrument leads passing through the cover of a pressure vessel containing fluids which are to be prevented from leaking out of the vessel.

Specifically, the invention relates to a device for use in the Experimental Breeder Reactor No. II (EBR-II) whereby expensive and delicate stainless-steel-clad instrument leads, which must be conducted through a cover of a primary tank surrounding the reactor core, may be adequately sealed against leakage of gas and vapor and at the same time be protected so that reuse of the same leads is possible without damaging them upon removal from the seal. EBR-II is described in *Solid Fuel Reactors*, Ch. 3, pp. 118 to 238 (J. R. Dietrich and W. H. Zinn ed. 1958; Addison-Wesley Publishing Company, Inc., Reading, Mass.)

In nuclear reactors designed for test and experimental purposes, it is frequently necessary to measure variables in the reactor core during reactor operation. Due to intense radiation and high temperature, such measurements are taken within the core but indicated remotely outside of the primary tank which contains a pool of liquid sodium in which the core is submerged. For this purpose, test assemblies are inserted into the core through the primary tank cover so that parameters such as coolant flow, temperature, pressure, etc., may be measured at many different known locations. The test assemblies contain stainless-steel-clad leads which connect to instruments, experiment capsules, or detectors at various positions along the test assembly. The group of leads associated with each test assembly must be brought out to external instrumentation through the primary tank cover. The bodies to which the ends of any given lead are connected may be many times larger in diameter than the lead itself. However, at the same time leakage to atmosphere of argon gas and sodium vapor above the sodium pool in the primary tank must be prevented because of the radioactivity and explosion hazards to persons outside the primary tank. In the past, this has required that the leads be welded or brazed into a larger seal body which then may be installed in the primary tank cover and sealed by conventional gasket means. However, removal of the instrumentation from the test assembly results in destruction of the instrument leads. A purpose of the invention is to enable the leads to be removed from the seal and the reactor with no damage to the leads or seal so that both the seal assembly and the leads may be reused as many times as desired. Also, if the lead is sealed to two larger bodies, the invention provides a way of sealing without using a large clamping seal through which one of the larger bodies would have to pass. Hence, the sealing is accomplished in a small area and conserves valuable space in the crowded access area above the primary tank cover.

SUMMARY OF THE INVENTION

The invention is a reusable seal assembly for preventing leakage of radioactive argon cover gas and sodium vapor from inside a primary tank of a liquid-metal-cooled fast-breeder nuclear reactor to the external atmosphere.

The multiple lead seal is comprised of a seal body having a threaded end, a plurality of flutes, and a seal shell. Both the seal body and seal shell are generally cylindrical in shape and the seal shell closely fits around the unthreaded portion of the seal body closing the flutes to form closed passages through the multiple lead seal.

Circumferential channels, one in the surface of the seal body and the other in the inner surface of the seal shell, are contiguous when the shell surrounds the seal body. The contiguous channels form a conduit which, since it surrounds the seal body, interrupts each passage, placing it in communication with a port through the wall of the seal shell. The conduit and port provide a path to each passage from outside the seal assembly.

In use, at least one stainless-steel-clad instrument lead is laid in each of the flutes of the seal body. The seal shell is then placed over the seal body completing the passages. The multiple lead seal assembly and leads are then inserted into the test assembly. Silicone rubber sealant in liquid form is injected through the port in the seal shell into the conduit communicating with all of the passages. The sealant fills the conduit and the space in the passages not occupied by the stainless steel leads and forms a gas-tight seal once it has hardened. The completed test assembly is then inserted into the reactor core through the primary tank cover.

When it is desired to remove the leads from the test assembly, the test assembly is removed from the core and a jacking nut, threaded onto the threaded end of the seal body, is screwed further onto the seal body, making contact with the seal shell; as the jacking nut exerts force on the seal shell, the seal body is jacked out of the shell and the hardened sealant is sheared by the jacking action. Once the seal body has been removed from the seal shell, the leads may be removed from the flutes in the body. The leads and seal assembly may then be cleaned of sealant and reassembled as previously described with a different number, type, or configuration of leads.

It is an object of the invention to provide a seal assembly which, in conjunction with sealant, will prevent leakage of sodium vapor and radioactive gas from inside a primary tank of a nuclear reactor to the external atmosphere.

It is another object of the invention to provide a seal assembly which does not require welding or brazing to be installed or sealed.

It is another object of the invention to provide a reuseable seal assembly.

It is another object of the invention to provide a seal assembly which allows removal of instrument leads without damage so that they may be reused.

It is another object of the invention to provide a compact seal assembly which uses as little space as possible in the primary tank cover.

BRIEF DESCRIPTION OF THE DRAWINGS

FIG. 1 is an exploded perspective view of a multiple lead seal assembly for a liquid-metal-cooled fast-breeder nuclear reactor.

FIG. 2 is a longitudinal section along line 2—2 of FIG. 3 showing the assembly with leads and sealant in place.

SPECIFIC EMBODIMENT OF THE INVENTION

Figure 3:
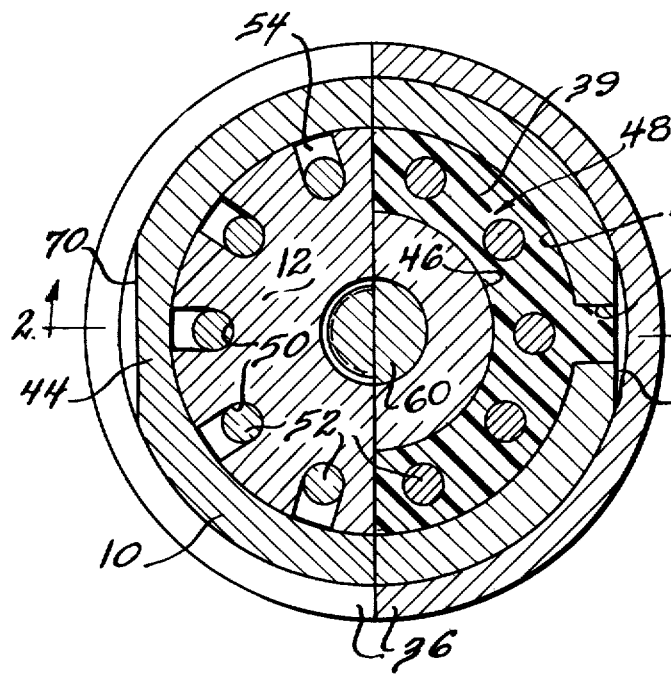
FIG. 3 is a transverse section along line 3—3 of FIG. 2.

Referring to FIG. 1, one component of the multiple lead seal assembly is a seal shell 10. The shell 10 is generally cylindrical in shape and is hollow; the internal diameter of the seal shell enables it to fit closely about a seal body 12. One function of the seal shell 10 is to enable mounting the seal assembly in a tubular end 14 of a test assembly shown in FIG. 2; the remainder of the test assembly is not shown. A mounting end 16 of the seal shell 10 is smaller in diameter than the rest of the seal shell 10. Mounting end 16 is joined to the remainder of the seal shell 10 by a tapering section 18 having the shape of a frustum of a cone. Six antirotation lugs 20 project from the mounting end 16 in two groups of three lugs each. The lugs 20 prevent rotation of the multiple lead seal assembly with respect to the end 14. Turning to FIG. 2, the antirotation lugs 20 engage antirotation notches 22 in end 14, thus precluding rotation. The tapering section 18 rests upon a seal shell support surface 24 on the inside of the end 14. The support surface 24 also has the shape of a frustum of a cone and therefore abuts tapering section 18.

Returning to FIG. 1, the seal shell 10 has a circumferential gasket groove 26 in its outer surface between the tapering section 18 and an oppposite, threaded end 28 of the shell 10. As shown in FIG. 2, when the multiple lead seal assembly is installed, the groove 26 is occupied by a gasket 30 which seals against leakage between the outer surface of the seal shell 10 and the end 14.

Returning to FIG. 1, a support ledge 32 surrounds the seal shell 10 between the groove 26 and the threaded end 28. The support ledge 32 consists of a portion of the seal shell 10 having a larger diameter than the rest of the seal shell and connected thereto by flat surfaces 34 at a right angle to the long axis of the cylindrical seal shell 10. FIG. 2 shows one surface 34 resting on the end 14 and the other surface 34 resting against a clamping nut 36; the support ledge 32 permits the seal shell 10 to be clamped between the end 14 and the clamping nut 36. The support ledge 32 is interrupted by a locating notch 33 which engages a locating lug (not shown) on end 14 of the test assembly; the notch insures the same orientation of the seal assembly with respect to the test assembly, so that leads 52 are readily identifiable to the instrument and instrument location in the core.

Continuing with FIGS. 1 and 2, a port 38 penetrates the wall of the seal shell 10 and connects to a circumferential channel 40 in the inner surface of the seal shell. The port 38 permits sealant 39 to be inserted into the multiple lead seal assembly.

The threaded end 28 is intended for use with a handling tool (not shown) which is used to disassemble the seal shell 10 from the end 14. Projecting from the threaded end 28 are three jacking lugs 42 spaced at equal intervals around the circumference of the seal shell 10 and projecting in the direction of the long axis of the shell. The lugs 42 cooperate with a jacking nut 44 to remove the seal body 12 from within the seal shell 10.

The seal body 12 is also cylindrical and partially fits closely inside the seal shell 10. A circumferential channel 46 near one end of the seal body 12 surrounds the portion of the seal body which fits inside the shell 10. A plurality of flutes 50 are spaced at intervals about the circumference of the seal body 12 parallel to the long axis of the cylindrical seal body and extend for the entire length of the seal body. Each flute 50 is intersected by the circumferential channel 46.

As shown in FIG. 2, when the multiple lead seal assembly is assembled, circumferential channels 40 and 46 are contiguous and form a conduit 48. The flutes 50 are occupied by leads 52 shown in FIG. 2 when the multiple lead seal assembly is assembled. Adverting to FIG. 3, when the seal body 12 is fitted inside the seal shell 10, each flute 50 is closed by the inner surface of the shell 10, thus forming a closed passage 54 extending the length of the seal body 12. The passages 54 are interrupted only by the conduit 48. The port 38 and conduit 48 cooperate to provide a path for sealant to be inserted into the passages 54 from outside the multiple lead seal assembly.

Returning to FIG. 1, a threaded end 56 away from the channel 46 on the seal body 12 is larger in diameter than the remainder of the seal body. Turning to FIG. 2, when the seal body 12 is inside the seal shell 10, the threaded end 56 abuts the end of the seal shell; threaded end 56 is smaller in diameter than the circle on which the jacking lugs 42 are located, so that the lugs partially cover the threads on end 56. A central hole 58, coaxial with the long axis of the seal body 12, provides for passage of a support rod 60 through the seal body. The support rod 60 is in turn anchored to a portion of the test assembly which is not shown. Support rod gasket groove 61 and gasket 63 cooperate to prevent leakage between the seal body 12 and support rod 60.

Referring to FIGS. 1 and 2, the clamping nut 36 is a hollow cylinder with two different internal diameters. A threaded end 62 has threaded engagement with the end 14. The opposite end of the clamping nut is a smaller internal diameter than the threaded end 62 and the two are joined by a flat surface 66 at a right angle to the long axis of the cylindrical clamping nut 36. When the clamping nut 36 is threaded onto the end 14, the support ledge 32 of the seal shell 10 is clamped between the end 14 and the flat surface 66 on the clamping nut 36; the seal shell is therefore rigidly fixed to the end 14. A hole 68 permits removal of the clamping nut 36 by means of a spanner wrench (not shown). The clamping nut 36 is locked in place by a set screw 67 in a hole 72.

The jacking nut 44 is internally threaded and engages the threaded end 56 of the seal body 12. The jacking nut 44 has two flats 70 so that a wrench (not shown) may be used to screw the jacking nut onto and off the seal body.

Turning to FIG. 2, the support rod 60 extends beyond the threaded end 56 of the seal body. A lock nut 74, also shown in FIG. 1, has threaded engagement with the support rod 60. On end of lock nut 74 abuts the threaded end 56 of the seal body 12 and clamps the seal body 12 between the end of the lock nut 74 and the threaded end 28 of the seal shell 10. Therefore, in the assembled configuration as shown in FIG. 2, the seal body 12 is clamped to the seal shell 10 which is in turn clamped to the end 14. The lock nut 74 is fixed in place by set screws 76 in holes 77.

In use, leads 52 are brought through the seal shell 10 and clamping nut 36 and jacking nut 44 and each lead 52 is placed in a flute 50 of the seal body 12. The seal body 12 is then inserted into the seal shell 10 so that each lead 52 occupies one passage 54 as shown in FIG. 2 and again in the left half of FIG. 3.

A gasket 30 is placed in gasket groove 26 of seal shell 10 and the seal shell 10, seal body 12 and leads 52 are placed in the end 14. Referring to FIGS. 2 and 3, a liquid sealant 39 such as silicone rubber is then injected through port 38 into conduit 48. The sealant 39 fills the conduit 48 and surrounds each lead 52, thus providing an effective seal against sodium vapor and argon gas attempting to leak through the seal assembly from the reactor via the test assembly. After the sealant 39 has dried to a rubbery hardness, the clamping nut 36 is screwed onto the end 14, clamping the seal shell 10 in place, and is locked with the set screw 67. The jacking nut 44 is screwed partially onto the threaded end 56 of the seal body 12 until it makes light contact with jacking lugs 42. Then lock nut 74 is screwed onto the support rod 60 and locked in place by set screws 76. The seal assembly is now complete. The leads 52 exiting the seal assembly may then be connected to remote instrumentation which is not shown.

Turning to FIG. 2, when disassembly becomes necessary, lock nut 74 is first removed and leads 52 are disconnected from remote instrumentation. Jacking nut 44 is screwed further onto threaded end 56; the jacking lugs 42 resist the motion of the jacking nut. The jacking action induces shear stress in the dried sealant 39 which is weaker than the combined structure of threaded end 56, jacking nut 44 and jacking lugs 42, with the result that the sealant 39 will shear well before damage to any of the metal structure of the seal assembly will occur. This in turn allows the seal body 12 to slide out of the seal shell 10. During this entire operation, no force is exerted on the leads 52 other than by the adhesion of sealant 39 in the conduit 48 to the leads 52 which are strong enough to be undamaged by this adhesion. Once the seal body 12 has been removed, the clamping nut 36 and seal shell 12 may also be removed. The leads 52 are taken out of the flutes 50 in seal body 12 and the seal assembly and leads are cleaned of sealant 39 and then may be reused exactly as previously described.

Figure 4:
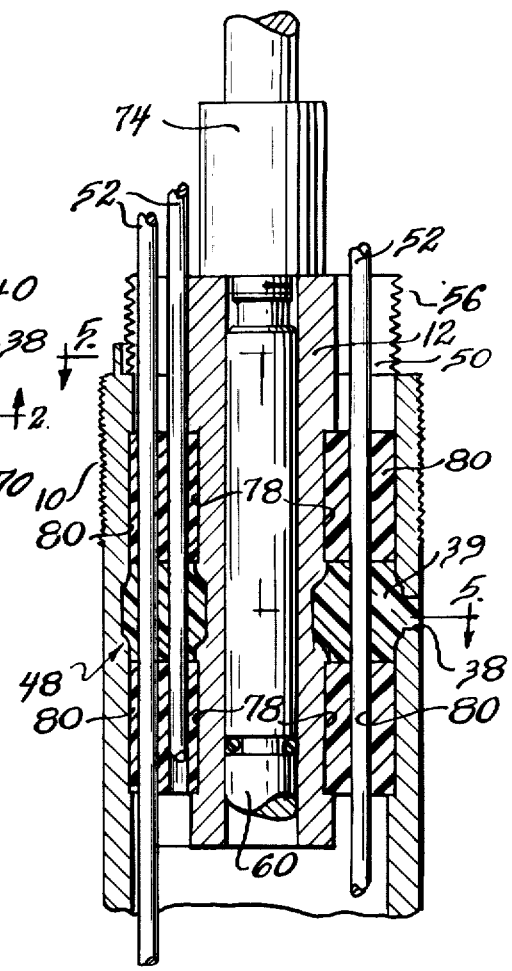
FIG. 4 is a longitudinal section of an alternate embodiment along line 4—4 of FIG. 5.
Figure 5:
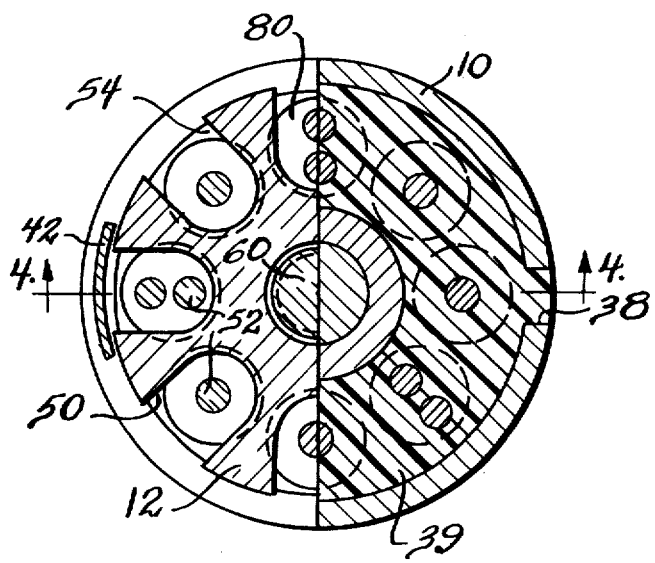
FIG. 5 is a transverse section along line 5—5 of FIG. 4.

FIG. 4 shows an alternate embodiment which may be used when it is desired to place more than one lead 52 in each flute 50 of the seal body 12. It may also be used where a lead 52 is considerably smaller in size than the passage 54, as shown in FIG. 5, formed by the body 12 and shell 10. Each flute 50 has a notch 78 on each side of the conduit 48 of sufficient size to accept a retainer 80 made of synthetic resin polymer.

Figure 6:
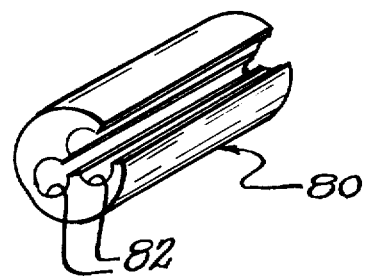
FIG. 6 shows a typical retainer sleeve for use with the alternate embodiment.

Each retainer, as shown in FIG. 6, has within it holes 82 to accommodate the desired number and size of leads 52 to be placed in each flute 50. FIG. 6 shows a retainer 80 with two such holes 82. The retainer is split longitudinally so that before the leads 52 are placed in the flutes 50 two retainers 80 are placed around the leads to be placed in each flute. The retainers 80 placed in notches 78 locate the leads 52 within the flutes 50 so that the leads 52 are safe from damage during assembly, use or disassembly of the multiple lead seal assembly. The retainers 80 have a resistance to shear stress roughly similar to that of the dried sealant 39 and hence disassembly of this embodiment of the multiple lead seal assembly is identical to that described for the previous embodiment.

The embodiments of the invention in which an exclusive property or privilege is claimed are defined as follows:

1. A reusable multiple lead seal assembly comprising:
    a hollow seal shell having a circumferential channel in its inner surface and a port through a wall of the seal shell connecting the circumferential channel with the outer surface of the seal shell;
    means for sealably attaching the seal assembly to an end of a test assembly, including a plurality of antirotation lugs projecting from the seal shell for engagement with antirotation notches in the end of the test assembly to prevent rotation of the lead seal assembly with respect to the test assembly;
    a seal body disposed in the seal shell, the surface of the seal body having a plurality of flutes, a circumferential body channel contiguous to the circumferential channel in the seal shell and forming a conduit therewith, which channel intersects each flute, and a threaded end of the seal body having an outer diameter less than the outer diameter of the seal shell;
    means for sealing the multiple lead seal assembly;
    at least one instrument lead in each flute of the seal body; and
    a jacking nut having threaded engagement with the threaded end of the seal body and movable against the end of the seal shell surrounding the seal body wherein when the jacking nut is screwed against the seal body the seal body will shear and release from the seal shell, breaking the seal without damage to the seal assembly and leads.

2. The reusable multiple lead seal assembly of claim 1 wherein the means for sealably attaching the seal to an end of a test assembly comprises:
    a clamping nut having threaded engagement with the end of the test assembly, a flat surface inside the clamping nut at a right angle to the long axis of the clamping nut which rests on a support ledge on the seal shell, thereby clamping the support ledge of the seal shell between the end of the test assembly and the flat surface on the inside of the clamping nut;
    a support rod attached to the test assembly which extends from the test assembly through a central hole in the seal body and having a threaded end projecting a distance past the seal body; and
    a lock nut having threaded engagement with the threaded end of the support rod and abutting an end of the seal body, thereby clamping the seal body between the lock nut and the end of the seal shell.

3. A multiple lead seal assembly for sealing instrument leads into the end of a test assembly in the cover of a primary tank surrounding a liquid-metal-cooled fast-breeder nuclear reactor comprising:
    a cylindrical hollow seal shell having a circumferential channel in its inner surface connected by a port through a wall of the shell with the outer surface of the seal shell, a threaded end, a plurality of jacking lugs projecting from the threaded end in the direction of the long axis of the seal shell, a support ledge consisting of a short section of larger diameter than the seal shell and joined thereto by flat surfaces at a right angle to the long axis of the seal shell for abutting an end of the test assembly on one flat surface and a flat surface on the inside of a clamping nut on the other flat surface, a locating notch interrupting the support ledge, an opposite end which is smaller in diameter than the remainder of the seal shell and connected thereto by a tapering section having the shape of a frustum of a cone for resting against an indentically shaped section inside the end of the test assembly, a plurality of antirotation lugs projecting from the other end of the shell for engagement with antirotation notches in the end of the test assembly to prevent rotation of the lead seal assembly with respect to the test assembly, and a circumferential gasket groove in the outer surface of the shell;

a clamping nut having an internally threaded portion at one end for engagement with an end of the test assembly, an internal portion of a lesser diameter, and a connecting flat surface, the surface being oriented at a right angle to the long axis of the clamping nut, whereby the support ledge on the seal shell may be clamped between the end of the test assembly and the flat surface on the clamping nut;

a cylindrical seal body partially fitting inside the seal shell and having a plurality of longitudinal flutes in its surface which cooperate with the seal shell to form closed passages, a circumferential channel contiguous to the circumferential channel in the seal shell and combining therewith to form a conduit intersecting each of the tubular passages, a threaded end of larger diameter than the remainder of the seal body and abutting the threaded end of the seal shell within the circle defined by the plurality of jacking lugs, and a hole through the center of the seal body coaxial with its long axis;

a central support rod attached to the test assembly, having an end extending through the hole in the seal body and projecting a distance beyond the seal body;

a lock nut having threaded engagement with the end of the support rod and abutting the threaded end of the seal body, thereby clamping the seal body between the threaded end of the seal shell and the end of the lock nut; and a jacking nut having threaded engagement with the seal body and in contact with the plurality of jacking lugs whereby when the lock nut is removed and the jacking nut is screwed against the jacking lugs the seal body will be jacked out of the seal shell.

* * * * *